United States Patent [19]

Patel et al.

[11] Patent Number: 5,404,794
[45] Date of Patent: Apr. 11, 1995

[54] COFFEE-MAKING MACHINE

[75] Inventors: Dahyabhai U. Patel, Port Coquitlam, Canada; Paul E. Rolfes, Newport Beach, Calif.

[73] Assignees: Cafe 98 Industries Ltd., New Westminster, Canada; AquaBrew, Inc., Santa Ana, Calif.

[21] Appl. No.: 50,789

[22] Filed: Apr. 22, 1993

[51] Int. Cl.⁶ .............................................. A47J 31/00
[52] U.S. Cl. ........................................ 99/280; 99/305; 99/307
[58] Field of Search ................. 99/279, 280, 281, 282, 99/283, 288, 299, 300, 302 R, 304, 305, 307, 316, 317; 426/433

[56] References Cited

U.S. PATENT DOCUMENTS

| | | |
|---|---|---|
| 3,455,088 | 7/1969 | Lerner . |
| 3,596,588 | 8/1971 | Moss ..................................... 99/282 |
| 3,641,918 | 2/1972 | Schellgell et al. . |
| 3,719,022 | 3/1973 | Cherio et al. . |
| 3,771,432 | 11/1973 | Karlen . |
| 3,774,367 | 11/1973 | Lerner . |
| 3,948,156 | 4/1976 | Smith ..................................... 99/280 |
| 4,248,032 | 2/1981 | Woods et al. . |
| 4,457,124 | 7/1984 | Hartman . |
| 4,590,748 | 5/1986 | Harrison et al. . |
| 4,689,937 | 9/1987 | Finan, Sr. et al. . |
| 4,793,513 | 12/1988 | Verheijen . |
| 4,829,888 | 5/1993 | Webster et al. . |
| 5,014,611 | 5/1991 | Illy ..................................... 99/280 |
| 5,063,836 | 11/1991 | Patel . |
| 5,193,437 | 3/1993 | Roberts ..................................... 99/280 |

FOREIGN PATENT DOCUMENTS

| | | |
|---|---|---|
| 0204411 | 12/1986 | European Pat. Off. . |
| 0244010 | 11/1987 | European Pat. Off. . |
| 1454231 | 2/1969 | Germany . |
| 8401201 | 11/1985 | Netherlands . |

*Primary Examiner*—Robert W. Jenkins
*Attorney, Agent, or Firm*—Fitzpatrick, Cella, Harper & Scinto

[57] ABSTRACT

A coffee-making machine includes a reservoir connected to an external water supply via a valve which is divided into hot and cold water tanks. The cold water tank feeds a boiler which operates to heat the water in the cold water tank only when a brew cycle has been initiated. Heated water from the boiler is fed to an expansion chamber before being discharged onto the ground coffee via a spray head at the end of the expansion chamber. Upper and lower water level sensors are in the cold water tank and detect water level conditions therein. A controller communicates with the upper and lower level sensors and the boiler and allows a brew cycle to be initiated only when the water level in the cold water tank is detected by the upper level sensor. When the water level in the cold water tank falls below the lower level sensor, the controller disables the boiler and opens the valve to replenish the water level in the cold water tank. A heating element is in the hot water tank and is energized by the controller to maintain the water therein at a preselected temperature. If the heating element is on and the brew cycle is initiated, the controller disables the heating element until the brew cycle is completed.

18 Claims, 4 Drawing Sheets

COFFEE-MAKING MACHINE

FIELD OF THE INVENTION

The present invention relates to coffee-making machines and in particular to a coffee-making machine of the type to receive water from an external supply and deliver hot water to ground coffee contained in a filter, to brew pots of coffee as required.

BACKGROUND OF THE INVENTION

Some conventional coffee-making machines commonly used in offices or in restaurants are provided with a water reservoir connected to the mains water supply, a heating element in the reservoir and various heat and flow controls so that an appropriate quantity of hot water is available for coffee brewing purposes. The ground coffee is contained in a removable filter basket disposed below the outlet of the hot water reservoir. When it is desired to brew a pot of coffee, a control is switched so that hot water from the reservoir exits through the ground coffee and the filter basket into a stored pot located on a warming plate below the filter basket. The reservoir is eventually filled with water and reheated, ready for brewing another pot of coffee. These machines often also include an external faucet in communication with the reservoir to allow cups of hot water to be withdrawn from the reservoir.

There are several disadvantages associated with such coffee-making machines. It is common to provide a reservoir of known volume substantially greater than that of the coffee pot so that an appropriate amount of hot water is delivered through the ground coffee to make a full pot of coffee whilst leaving a substantial amount of water in the reservoir. The refilling of the reservoir is normally controlled by a timer mechanism which opens a water inlet valve to the reservoir for a preset period of time prearranged to refill the reservoir. Such an arrangement often leads to insufficient refilling of the reservoir since the timer mechanism cannot take into account variations in the mains water pressure. Moreover the withdrawal of small cups of water from the faucet is not compensated by the timer mechanism. Both of these factors commonly lead to brewing of a short pot of overly strong coffee.

Moreover, conventional coffee-making machines tend to be deficient in their temperature control of the water in the reservoir. It is desirable to contact the ground coffee with water at a temperature between 195° F. and 205° F. These machines typically employ a mechanical thermostat in the reservoir which must be set lower than this temperature to allow a margin of safety against boiling over. Unfortunately, these thermostats react slowly to cooling water and must often tolerate a temperature decline of between 10° F. to 15° F. before reheating. Some heat is lost in the delivery of the water from the reservoir to the ground coffee. As a result, conventional coffee-making machines deliver water to ground coffee at a temperature of about 180° F. to 185° F.

U.S. Pat. No. 5,063,836 to Patel and assigned to Café 98 Industries Ltd. discloses a coffee-making machine designed to overcome the above-identified problems. This coffee-making machine includes a reservoir in which is located a heating element. Upper and lower level sensors are in the reservoir and detect the water level in the reservoir. A temperature sensor is also located in the reservoir while a valved inlet acts between the reservoir and the mains water supply. A control circuit communicates with the heating element, the upper and lower level sensors, the temperature sensor and the valved inlet. The circuit operates the heating element when the temperature of the water in the reservoir falls below a predetermined temperature. The control circuit opens the valved inlet when the water level in the reservoir falls below the lower level sensor and closes the valved inlet when the water level reaches the lower level sensor. If the lower level sensor fails, the upper level sensor causes the control circuit to close the valved inlet when the upper level sensor comes into contact with water.

Since level sensors are used in the reservoir instead of a timer mechanism, the water level in the reservoir is always sufficient to ensure enough water to brew a full pot of coffee. Also, the temperature sensor, heating element and control circuit operate to maintain the temperature of the water in the reservoir at a temperature of between 205° F. and 210° F., sufficiently above that achieved with conventional coffee-making machines.

When operated to brew a pot of coffee, the coffee-making machine delivers hot water in the reservoir through ground coffee held in the filter basket located below the spray head. The brewed coffee drips from the filter basket and is either received in a coffee pot located on a warmer plate below the filter basket or a thermal server of the type shown in U.S. Pat. No. 5,038,959 to Patel and assigned to Café 98 Industries Ltd, the contents of which is incorporated herein by reference. The thermal server allows the brewed coffee to enter the server without removing the lid of the server. This in conjunction with the lid design minimizes heat loss and therefore, this server maintains the brewed coffee hot for extended periods of time without requiring a heating element.

Although this coffee-making machine and thermal server work satisfactorily, the dimensions of the coffee-making machine sometimes make it awkward to use, especially on kitchen counters with overhead cupboards. Typically, these kitchens designs are prefabricated with the clearance between the counter and the bottom of the overhead cupboards being an industry standard which is smaller than the vertical dimension of the coffee-making machine.

It is therefore an object of the present invention to provide a novel coffee-making machine which obviates or mitigates at least some of the above disadvantages while still ensuring sufficient water in the reservoir to brew a full pot of coffee and maintaining the temperature of the water contacting the ground coffee at a temperature above most conventional coffee-making machines.

SUMMARY OF THE INVENTION

According to one aspect of the present invention there is provided a coffee-making machine of the type to receive water from an external source and deliver hot water to ground coffee comprising:

a reservoir to receive and hold water from said external source;

a boiler connected to said reservoir;

a discharge head connected to said boiler; and a controller in communication with said boiler and being responsive to a brew command, said controller initiating said boiler to heat water received from said reservoir only upon receipt of said brew command.

Preferably, the reservoir includes a lower level sensor and an upper level sensor with the controller initiating the boiler in response to the brew command only when the water level in the reservoir is detected by the upper level sensor and disabling the boiler when the water level in the reservoir drops below the lower level sensor. It is also preferred that valved inlet means responsive to the controller, act between the external source and the reservoir with the controller opening the valved inlet means when the water level in the reservoir drops below the lower level sensor and closing the valved inlet means when the water level in the reservoir is detected by the upper level sensor. Preferably, timing means are provided and are initiated when the valved inlet means is opened. The timing means is reset if the water level in the reservoir is detected by the upper level sensor within a preselected time but provides output to the controller to close the valved inlet means if the water level in the reservoir is not detected by the upper level sensor within the preselected time to indicate a fault condition.

Preferably, the discharge head includes an expansion chamber and a spray head to deliver hot water to the ground coffee with the expansion chamber interconnecting the boiler and the spray head. It is also preferred that a steam trap including conduit means extends between the expansion chamber and the reservoir.

Preferably, the reservoir is divided into a hot water tank and a cold water tank by a baffle with the cold water tank communicating with the valved inlet means and housing the upper and lower level sensors and with the hot water tank receiving water from the cold water tank and including a heating element responsive to the controller to heat water therein to a preselected temperature and faucet means to allow heated water to be withdrawn from the hot water tank. It is also preferred that the controller disables the heating element when the boiler is initiated. Furthermore, it is preferred that temperature sensing means are provided on the hot water tank with the controller monitoring the temperature sensing means and initiating the heating element when the temperature of the water in the hot water tank falls below the preselected temperature.

In one embodiment, it is preferred that the valved inlet means is connected to a mains water supply while in another embodiment, it is preferred that the valved inlet means is connected to a contained water source via pump means.

According to another aspect of the present invention there is provided a coffee-making machine of the type to receive water from an external source and deliver hot water to ground coffee comprising:

a reservoir to receive and hold water and being divided into a hot water tank and a cold water tank by a baffle, said cold water tank communicating with valved inlet means connected to said external source;

heating means associated with said cold water tank to heat water held therein prior to delivery of heated water to said ground coffee;

a discharge head to deliver heated water to said ground coffee;

means to deliver heated water to said discharge head; and a controller in communication with said heating means and said delivery means, said controller initiating said delivery means to deliver heated water to said discharge head in response to a brew command, wherein said hot water tank receives water from said cold water tank and includes a heating element responsive to said controller to heat water therein to a preselected temperature and faucet means to allow heated water to be withdrawn from said hot water tank.

BRIEF DESCRIPTION OF THE DRAWINGS

Preferred embodiments of the present invention will now be described more fully with reference to the accompanying drawings in which.

DESCRIPTION OF THE PREFERRED EMBODIMENTS

Figure 1:
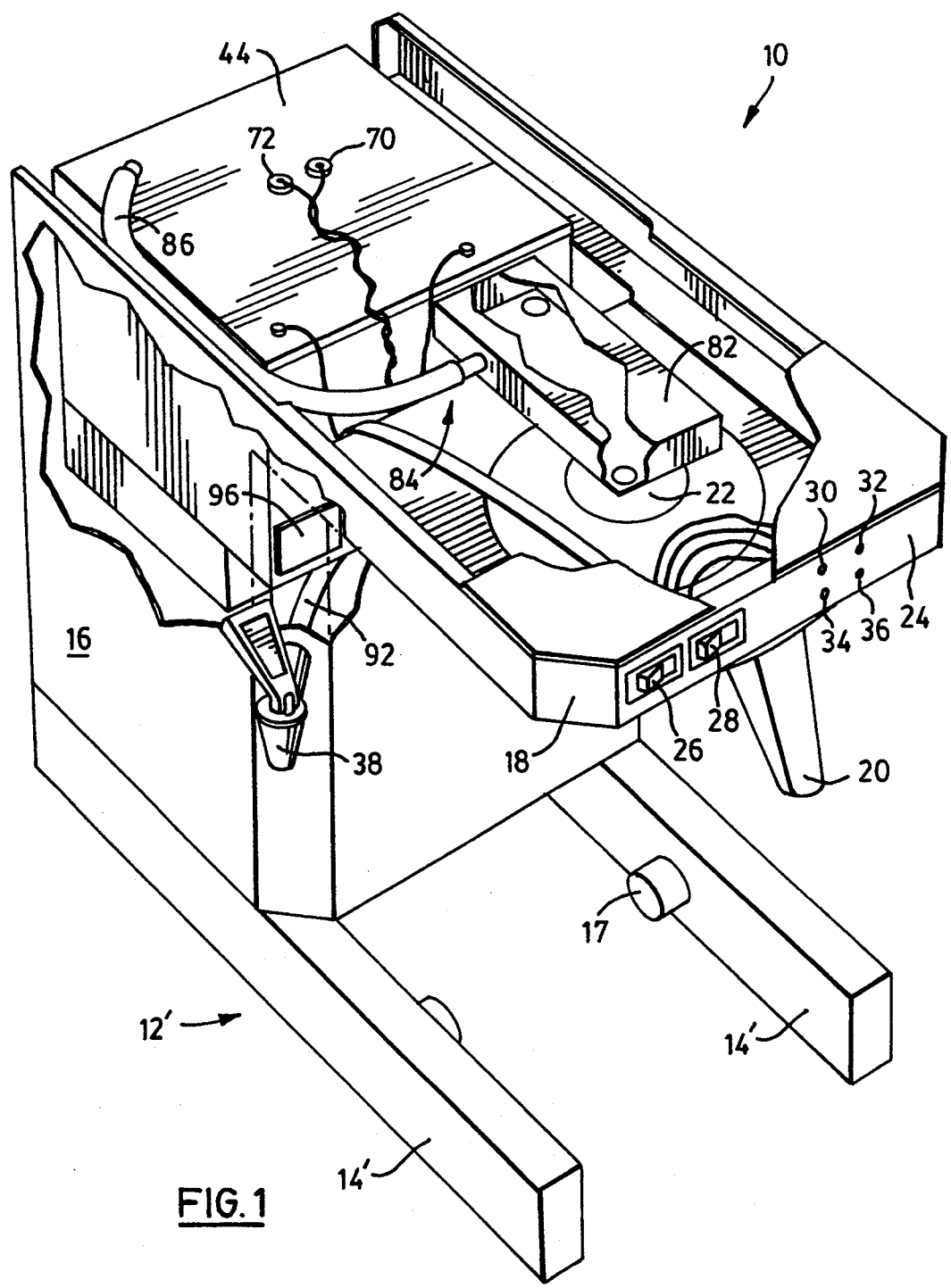
FIG. 1 is a perspective view partially exposed of a coffee-making machine taken from above and from the side in accordance with the present invention.
Figure 2:
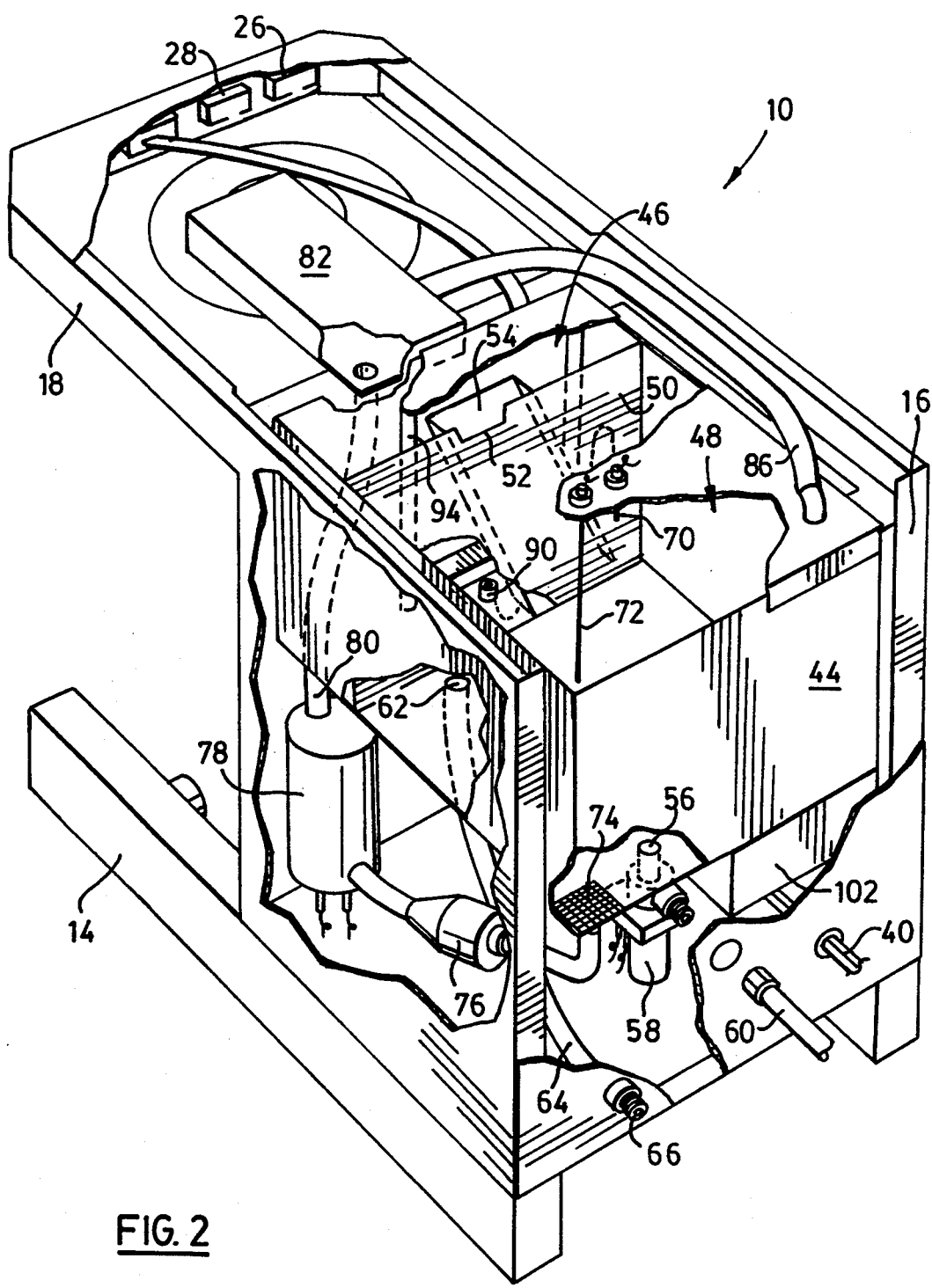
FIG. 2 is another perspective view partially exposed of the coffee-making machine shown in FIG. 1 taken from above and from the rear.

Referring now to FIGS. 1 and 2, a coffee-making machine is shown and is generally indicated by reference numeral 10. The machine 10 includes a base 12 in the form of a pair of laterally spaced rectangular arms 14. A column 16 is located at one end of the base and houses most of the operating parts of the coffee-making machine. A pair of stops 17 are provided on the arms in front of the column 16. A head 18 extends forwardly of the top of the column 16 and overlies the other end of the base 12. The head 18 removably supports a filter basket 20 in which ground coffee is contained. A hot water outlet in the form of a spray head 22 protrudes downwardly from the head 18 into the vicinity of the filter basket 20. At the front of the head 18 is a control panel 24. The control panel has an on/off switch 26, a brew switch 28, an on light 30, a ready light 32, a brew light 34 and a service light 36. An outlet faucet 38 protrudes from the column 16 near the front of the column and a power cord 40 exits the coffee-making machine 10 through the rear wall of the column.

Within the column 16 is an enclosed water reservoir 44 divided into hot and cold water tanks 46 and 48 respectively by a baffle 50. The baffle 50 has a notch 52 in its top to permit fluid to flow between the tanks when the fluid level in the tanks reaches a predetermined level. A vertical anti-splash guide 54 runs along baffle 50 within the hot water tank 46 from the notch 52 and stops just above the base of the hot water tank.

The cold water chamber 48 has an inlet 56 in its base connected to one port of a valve 58. The other port of the valve 58 passes through the rear wall of the column 16 and is connected to the mains water supply by a conduit 60. Thus, cold water flow from the mains water supply into the cold water chamber 48 is controlled by the valve 58. A drain outlet 62 is provided in the base of the cold water chamber 48 and has one end of a plastic tube 64 connected to it. The other end of the tube is sealed via a plug 66 on the rear wall of the column 16. The tube 64 can be removed from the plug 66 to allow the water in the cold water tank 48 to be drained if desired.

Depending from the top of the reservoir 44 are upper and lower level sensors 70 and 72 respectively in the form of cylindrical probes which extend into the cold water chamber 48. The lower level sensor 72 functions to detect a reservoir fill condition while the upper level sensor 70 functions to detect a reservoir full condition. A water outlet 74 is located in the base of the cold water chamber 48 and leads to one port of a one way valve 76. The other port of the one way valve 76 is connected to the inlet of a boiler 78. A temperature sensor (not shown) in the form of a thermistor is on the boiler. A generally vertical conduit 80 is connected to the outlet of the boiler 78 and leads to the inlet of a rectangular expansion chamber 82. The expansion chamber 82 is within the head 18 and has its outlet adjacent the spray head 22. A steam trap 84 is provided and is in the form of a conduit 86 which leads from the expansion chamber 82 to the cold water tank 48.

The hot water chamber 46 has an outlet 90 in its base. The outlet is connected to the faucet 38 via a conduit 92 to allow hot water therein to be withdrawn. A U-shaped heating element 94 depends from the top of the reservoir 44 and is operated to heat the water in the hot water chamber 46 when the water therein falls below a predetermined selected temperature. A temperature sensor 96 also in the form of a thermistor is located on one of the exterior walls of the hot water chamber 46 to sense the temperature of the water therein.

A controller 100 (see FIG. 3) is mounted on a support 102 below the reservoir 44. The controller is in electrical communication with the valve 58, the boiler 78, the upper and lower level sensors 70 and 72, the heating element 94, the temperature sensors, and the control panel 24. The controller 100 receives power from the ac mains via the cord 40 and controls the operation of the coffee-making machine 10 in accordance with desired operation selected via the control panel 24 and output received from the various sensors, as will be described.

Figure 3:
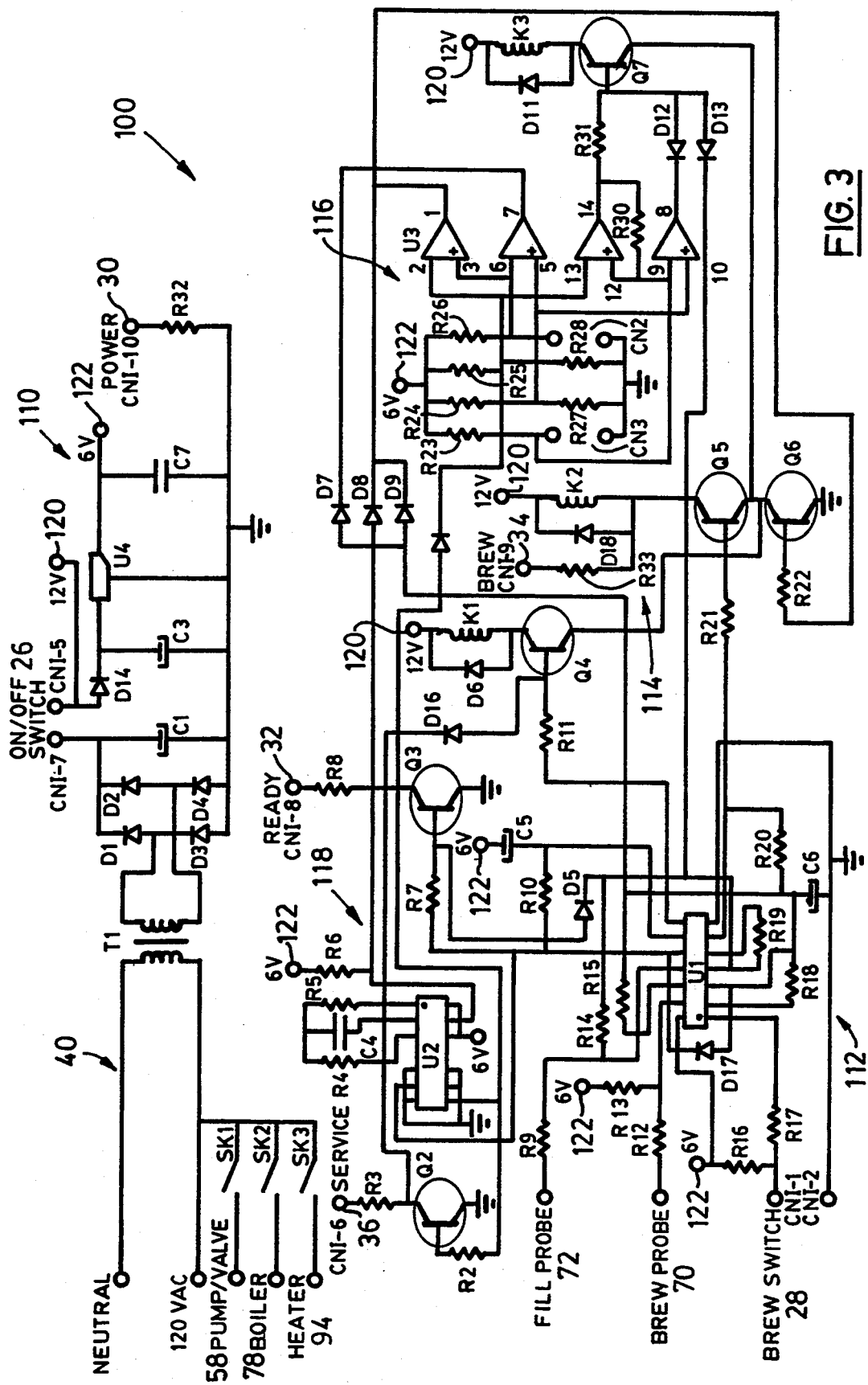
FIG. 3 is a schematic of a control circuit used in the coffee-making machine shown in FIG. 1.

FIG. 3 best illustrates the controller 100 and as can be seen, the controller includes a power supply circuit 110, a water level detecting circuit 112, a brewing circuit 114, a temperature sensing circuit 116 and a timing circuit 118. The power supply circuit 110 includes a transformer T1 whose primary receives the hot and cold wires of the cord 40. The hot wire also leads to the valve 58 via a relay actuated switch SK1, to the boiler 78 via a relay actuated switch SK2 and to the heating element 94 via a relay actuated switch SK3. The 12 VAC output of the transformer secondary is applied to a full wave rectifier constituted by diodes D1 to D4 and filtered by capacitor C1. The filtered output is then fed to one terminal of the on/off switch 26. The other terminal of the on/off switch 26 is directed to a 12 dc volt supply pin 120 as well as through a diode D14 to a capacitor C3 and to a 6 dc volt regulator U4. The regulator U4 provides a 6 volt supply on supply pin 122. The capacitor C3 acts as a storage capacitor which maintains the output of the regulator U4 basically constant in the event of transients. A capacitor C7 couples the supply pin 122 to ground and is used for high frequency by-pass on the supply pin 122. A current limiting resistor R32 leads from one terminal of the capacitor C7 to the on light 30 on the control panel 24.

The water level detecting circuit 112 includes a fourteen pin HEX inverter U1. The upper level sensor 70 is electrically connected to pin 13 of inverter U1 via a resistor R12. Pin 13 is also connected to the 6 volt supply pin 122 through resistor R13. The lower level sensor 72 is electrically connected to pin 11 of inverter U1 via resistor R9. Pin 14 of inverter U1 is connected directly to the supply pin 122. Resistor R16 is also connected to the supply pin 122 and leads to one terminal of the brew switch 28 as well as to pin 1 of the inverter U1 via resistor R17. The other terminal of the brew switch 28 leads to pin 7 of the inverter U1.

Pins 4 and 5 of inverter U1 are connected through a resistor R19. Pin 9 of the inverter is connected to the supply pin 122 via a capacitor C5. Pin 2 of the inverter leads to one terminal of resistor R18. The other terminal of the resistor R18 is connected to pin 3 of the inverter U1 and also leads to one terminal of a resistor R20. The other terminal of the resistor R20 is connected to pin 6 of inverter U1 and also leads to the base of a transistor Q5 via resistor R21.

Pin 3 of inverter U1 is connected to pin 10 of the inverter via a diode D7. Pin 10 of inverter U1 is also connected to the base of a transistor Q3 via resistor R7 and to pin 5 of a timer U2 in the timing circuit 118. The collector of the transistor Q3 is connected to the ready light 32 via resistor R8 and the base of transistor Q3 leads to ground. A resistor R10 interconnects pins 9 and 10 of the inverter U1. A diode D5 has one of its terminals connected between the resistor R7 and the base of transistor Q3 while its other terminal is connected to pin 4 of inverter U1. Pin 8 of inverter U1 is connected to the base of a transistor Q4 via resistor R11. Pin 12 of the inverter U1 is connected to one terminal of two diodes D7 and D9 respectively via resistor R15. A capacitor C6 is connected between the diodes D7 and D9 and the resistor R15 and extends to ground.

A diode D16 has one of its terminals connected between the resistor R11 and the transistor Q4 while its other terminal is connected to the service light 36 via resistor R3 and to the collector of a transistor Q2. The emitter of the transistor Q2 is connected to ground while its base is connected to both pin 7 of the timer U2 and to one terminal of a diode D17 via a resistor R2.

Examining the timing circuit 118 it can be seen that pins 4, 6, 8 and 9 of the timer U2 are connected to ground while pins 10 and 12 of the timer are connected to the supply pin 122. Pins 1 and 3 of the timer U2 are interconnected by series resistors R4 and R5 while a capacitor C4 extends from between the resistors R4 and R5 to pin 2 of the timer U2. Pin 11 of the timer leads to both the supply pin 122 via resistor R6 and to one terminal of a diode D8.

The collector of transistor Q4 is connected to the supply pin 120 via a relay coil K2 and via a diode D6 in parallel with the relay coil. The base of the transistor Q4 is connected to the emitter of a transistor Q7, forming part of the temperature sensing circuit 116, to the base of transistor Q5 forming part of the brewing circuit 114, and to the collector of a transistor Q6. The collector of transistor Q7 is connected to the supply pin 120 via a relay coil K3 and via a diode D11 in parallel with the relay coil. The base of the transistor Q7 is connected to pin 4 of the inverter U1 through a diode D13 as well as to one terminal of the diode D15. The base of transistor Q7 also leads to the output terminal 14 of an op amp U3$_3$ forming part of a Quad Op Amp package U3 via a resistor R31. The output terminal 14 is also fed back to the positive input terminal 12 of the op amp U3$_3$ and to the negative input terminal 9 of an op amp U3$_4$ via resistor R30.

The output terminal 8 of op amp U3$_4$ is connected to one terminal of a diode D12 which has its other terminal connected between the resistor R31 and the transistor Q7. The positive input terminal 10 of the op amp U3$_4$ is connected to the positive input terminal 5 of an op amp $U3_2$. The output terminal 7 of op amp $U3_2$ leads to a terminal of diode D7. The negative input terminal 6 of op amp $U3_2$ is connected to the positive input terminal 3 of an op amp $U3_1$. The positive input terminal 2 of op amp $U3_1$ is connected to the negative input terminal 13 of op amp $U3_3$ as well as to one terminal of diode D17. The output terminal 1 of op amp $U3_1$ is connected to one terminal of both diodes D8 and D9 as well as to the base of transistor Q6 via resistor R22. The emitter of the transistor Q6 is connected to ground while its collector is connected to the emitter of transistor Q5 and to the emitter of transistor Q4.

Transistor Q5 as mentioned previously is connected to the inverter U1 via resistor R21 and is also connected to the supply pin 120 via a relay coil K2 and via a diode D10 in parallel with the relay coil. The collector of transistor Q5 is also connected to the brew light 34 via a resistor R33.

Input terminals 9 and 12 of op amps $U3_4$ and $U3_3$ respectively are connected to a voltage divider constituted by resistor R23 and the temperature sensor 96 which bridges contact nodes CN3. A second voltage divider constituted by resistors R24 and R27 extends between the supply pin 122 and ground. The positive input terminal 5 of op amp $U3_2$ and the positive input terminal 10 of op amp $U3_4$ are connected to the voltage divider between the resistors R24 and R27. A third voltage divider constituted by resistors R25 and R28 extends between the supply pin 122 and ground. One terminal of diode D17 and the negative input terminals 2 and 13 of op amps $U3_1$ and $U3_3$ respectively are connected to the voltage divider between the resistors R25 and R28. The positive input terminal 5 of op amp $U3_2$ is connected to the supply pin 122 via resistor R26 as well as to one terminal of a contact node CN2. The other terminal of contact node CN2 is connected to ground. The temperature sensor on the boiler 78 bridges the contact nodes CN2 to form another voltage divider.

In operation, when the coffee-making machine 10 is initially connected to the mains water supply via the conduit 60 and the cord 40 is plugged into the ac mains, the power supply circuit 110 provides 12 dc volts on supply pin 120 and 6 dc volts on supply pin 122. The on light 30 is also illuminated.

When the upper and lower level sensors 70 and 72 are not contacting water, pins 1 and 13 of inverter U1 receive a logic high from the supply pin 122. This causes pins 2 and 12 of the inverter to go low. Pin 3 of the inverter U1 is also low. Because pin 3 is connected through resistors R15, R18 and R20 to pins 12, 2 and 6 of the inverter U1 respectively such that if any two of these pins are high pin 4 will be low, and if any two of these pins are low, pin 4 will be high, in this instance pin 4 is high.

The logic high at pin 4 of the inverter U1 is applied to pin 5 of the inverter through resistor R19 which in turn causes pin 6 of the inverter to go low. This holds the base of the transistor Q5 low through resistor R21 preventing the relay coil K2 from being energized and thereby isolating the boiler 78 from the ac mains. The logic high at pin 4 of the inverter U1 is also applied to resistor R14 which causes pin 11 of the inverter to go high. When pin 11 of the inverter goes high, pin 10 of the inverter is driven low. When pin 10 is low, the inverter U1 drives pin 3 low through diode D17 thereby preventing the brew cycle from being initiated. Thus, the brew cycle cannot be started when the water level in the cold water tank 48 is not at the upper level sensor 70 even if the brew switch 28 is actuated.

Pin 9 of the inverter U1 which is connected to pin 10 is driven low. This allows capacitor C5 to charge. When capacitor C5 charges, pin 8 of the inverter U1 goes high and this drives the base of transistor Q4 through resistor R21 turning it on. Transistor Q6 which is also on (as will be described) allows current to flow from the supply pin 120 through the relay coil K1 and the transistors Q4 and Q6 to ground. This in turn actuates switch SK1 connecting the valve 58 to the ac mains so that the valve opens allowing water to enter the cold water chamber 48 from the mains water supply.

As water enters the cold water chamber 48 it flows into the drain tube 64 and the boiler 78 via the one way valve 76. When the drain tube fills and the water level in the boiler 78 reaches the same level as the base of the cold water chamber 48, the water level in the boiler 78 and the cold water chamber 48 begins to rise simultaneously. As the water level in the cold water chamber 48 nears the upper level sensor 70, it spills into the hot water chamber 46 via the notch 52 formed in the baffle 50 and is guided by anti-splash guide 54. The water level in the cold water chamber 48 therefore remains below the upper level sensor 70 while the hot water chamber 46 is filling. When the water level in the hot and cold water chambers equalizes, the water level in the reservoir 44 rises and contacts the upper level sensor 70.

When the water reaches the upper level sensor 70, pin 11 of the inverter goes low causing pin 10 of the inverter to go high. This in turn causes capacitor C5 to discharge driving pin 9 of the inverter U1 high. Pin 8 of the inverter is in turn driven low which results in transistor Q4 being shut off. With transistor Q4 off, current flow through the relay coil K1 stops causing the switch SK1 to open thereby isolating the valve 58 from the ac mains. The valve 58 therefore closes isolating the cold water chamber 48 from the mains water supply.

When pin 10 of the inverter U1 goes high, the transistor Q3 is turned on through resistor R7 resulting in the ready light 32 being illuminated indicating that the coffee-making machine 10 is able to brew a pot of coffee. The logic high on pin 10 of the inverter also resets the timer U2 as will be described. With pin 10 of the inverter high, diode D17 is reversed and pin 3 of the inverter U1 is allowed to be controlled by resistors R15, R18 and R20. Since the cold water tank 48 is full, the upper level sensor 70 touches water and this holds pin 13 of the inverter U1 low through resistor R12 which causes pin 12 of the inverter to go high. Since pins 2 and 6 of the inverter become both low, pin 4 of the inverter remains high.

When it is desired to brew a pot of coffee, the ready light 32 on the control panel 24 must be illuminated before the coffee-making machine 10 will respond to actuation of the brew switch 28. If the ready light 32 is on, it is necessary to place ground coffee and a filter in the filter basket 20. It is also necessary to place a thermal server such as the type disclosed in U.S. Pat. No. 5,038,959 to Patel between the arms 14 beneath the spray head 22 to collect the brewed coffee. The stops 17 on the arms 14 ensure that the thermal server is properly positioned with the central portion of the lid on the thermal server being directly beneath the spray head.

When the brew switch 28 is actuated, the junction of resistors R16 and R17 goes low causing pin 1 of the inverter to go low and pin 2 of the inverter to go high. With pins 2 and 12 of the inverter both high, pin 4 of the inverter U1 goes low causing pin 5 of the inverter to go low through resistor R19. As pin 5 goes low, pin 6 of the inverter is driven high which results in the transistor Q5 being turned on through resistor R21. With transistors Q5 and Q6 on, current flows from the supply pin 120 through the relay coil K2 and the transistors Q5 and Q6 to ground. The brew light 34 is also illuminated. With the relay coil K2 energized, switch SK2 closes connecting the boiler 78 to the ac mains and the process of boiling water and discharging it to the expansion chamber 82 begins.

Once the boiler is connected to the ac mains is quickly heats up the water therein to a temperature of about 212° F. so that the water boils. When the water boils, it flows rapidly upwards along the conduit 80 at a high speed to the expansion chamber 82. When the boiling water enters the expansion chamber 82, it slows down and drops to a temperature of about 205° F. The water then travels along the expansion chamber 82 to the spray head 22 where it is discharged and contacts the ground coffee in the filter basket 20. Most of the steam that enters the expansion chamber 82 is collected by the steam trap 84 and flows from the expansion chamber 82 into the cold water chamber 48 via the conduit 86. The steam therefore acts as pre-heat for water stored in the cold water tank 48. The steam trap 84 reduces the amount of steam exiting the head 18 via the spray head 22 to avoid condensation build up on the exterior of the coffee making machine 10.

As water boils and leaves the boiler 78 it is replenished by water entering the boiler at its inlet under the influence of gravity. The one way valve 76 prevents back flow of water from the boiler 78 into the cold water chamber 48. The boiler in turn heats up the water wherein it exits the boiler 78 and flows to the expansion chamber 82 as described previously. As water is boiled and discharged onto ground coffee, the water level in the cold water tank 48 falls below the upper level sensor 70 bringing it out of contact with water. Although this is the case, pin 11 of this inverter U1 is still held low through resistor R14, since pin 4 of the inverter is low, and this prevents transistor Q4 from being turned on. This process continues until the water level in the cold water chamber 48 falls below the lower level sensor 72.

When this occurs, pin 13 of the inverter is driven high through resistor R13 and this causes pin 12 of the inverter to go low. Since pin 2 of the inverter is also low, pin 4 of the inverter goes high which in turn causes pin 6 of the inverter to go low. With pin 6 low, the transistor Q5 is shut off resulting in the relay coil K2 being de-energized so that switch SK2 opens isolating the boiler 78 from the ac mains and stopping the brew cycle. Since pin 1 of the inverter is high once again, pin 11 of the inverter becomes high as described previously, resulting in the valve 58 being opened so that the cold water tank 48 fills with water from the mains water supply.

Also, when valve 58 is opened to fill the cold water tank 48 and the water level in the cold water tank 48 is below the upper level sensor 70, pin 10 of the inverter is low. Pin 10 is connected to pin 6 of the timer U2 and when pin 6 of the timer is low the timer begins timing. The timing is set by capacitor C4 and the state of pin 11 of the timer U2. With the capacitor C4 equal to about 0.047 μF and pin 11 high, the time is set to approximately 2½ minutes. When pin 11 of the timer U2 is low, the time is set to approximately 1 second. Pin 11 of the timer 112 is normally held high through resistor R6.

Thus, as the cold water tank 48 begins to fill, the timer 112 starts timing. If the water level in the cold water tank 48 reaches the upper level sensor 70 before the timer times out, pin 10 of the timer U2 goes high causing pin 6 of the timer to go high which resets the timer. The output pin 8 of the timer U2 therefore remains low.

However, if the 2½ minutes elapse and the water level in the cold water chamber 48 is still below the upper level sensor 70, the controller 100 illuminates the service light 36 indicating that there is a problem with the water feed to the coffee-making machine 10. Once the service light 36 has been illuminated, the controller 100 disables the valve 58 until the machine 10 is reset by actuating the on/off switch 26 off and then on again.

In particular, this is achieved in the following manner. If the water level in the cold water tank 48 does not reach the upper level sensor 70 before the timer times out, the output 8 of the timer U2 goes high. When pin 8 of the timer U2 goes high, transistor Q2 is turned on causing the service light 36 to be turned on through resistor R3. With transistor Q2 on, the base of transistor Q4 is driven low through diode D16 causing the transistor Q4 to shut off which in turn de-energizes the relay coil K1 and isolates the valve 58 from the ac mains. With the valve shut, the water level in the cold water tank does not reach the upper level sensor 70. As described before, this results in pin 11 of the inverter being high, causing pin 10 of the inverter U1 to go low which prevents the brew cycle from being started through diode D17 even if the brew switch 28 is actuated.

The controller 100 also monitors the output of the temperature sensor 96 and activates the heating element 94, when the temperature of the water in the hot water chamber 46 is below the predetermined selected temperature. The heating element 94 is maintained on until the water in the hot water tank has reached or exceeds the predetermined selected temperature. When this occurs, the heating element 94 is removed from the ac mains until the temperature of the water in the hot water chamber 46 has fallen below the selected temperature once again.

Specifically, the desired temperature of the water in the hot water tank 46 is determined by the selection of resistors R23, R25 and R28 and the temperature sensor 96 connected across contact nodes CN3. A voltage is set through resistors R25 and R28 on input terminal 13 of op amp U3$_3$. This voltage is compared with the voltage determined by the resistor R23 and the temperature sensor 96 which is applied to input terminal 12 of op amp U3$_3$. If the voltage at input terminal 12 is higher than the voltage at input terminal 13, the output of the op amp U3$_3$ is high which in turn drives the transistor Q7 to an on state through resistor R31. With transistor Q7 on, current flows from the supply pin 120 through the relay coil K3 and transistor Q6 to ground. When the relay coil K3 is energized, the switch SK3 closes thereby connecting the heating element 94 to the ac mains.

The temperature sensor 96 which is responsive to temperature decreases in resistance as the temperature of the water in the hot water tank 46 increases. This results in the voltage at the input terminal 12 decreasing. When the voltage at input terminal 12 drops below that at input terminal 13, the output of the op amp U3$_3$ goes low thereby shutting off the transistor Q7. With transistor Q7 off, the relay coil K3 is de-energized resulting in switch SK3 opening and the heating element 94 being removed from the ac mains. The feedback resistor R30 sets the difference in voltage required between the input terminals 12 and 13 in order to turn the op amp $U3_3$ off and on.

At any time, water can be withdrawn from the hot water chamber 46 via the faucet 38. The baffle 50 ensures that the water level in the cold water chamber 48 remains at a certain level sufficient to brew a full pot of coffee regardless of whether the water in the hot water chamber 46 has been withdrawn via the faucet 38.

The voltage divider sets a voltage on input terminal 10 of op amp $U3_4$. This voltage is selected so that it will always be greater in magnitude than the voltage applied to input terminal 9 (which is connected to input terminal 12) as long as the temperature sensor 96 is connected between the contact nodes CN3. This causes the output of the op amp $U3_4$ to go high, reversing diodes D12 and D13. If the temperature sensor 94 becomes disconnected from the contact nodes. CN3, the voltage at input terminal 9 will be greater than the voltage at input terminal 10 causing the output of the op amp $U3_4$ to go low. When the output of the op amp $U3_4$ goes low, the base of transistor Q7 is held low through diode D12 causing the transistor to shut off. This in turn de-energizes the relay coil K3 and isolates the heating element 94 from the ac mains.

When a brew cycle has been initiated and the boiler 78 is operating, the base of transistor Q7 is held low through diode D13 which is connected to pin 4 of the inverter U1 causing the transistor Q7 to shut off. This in turn de-energizes the relay coil K3 and isolates the heating element 94 from the ac mains if it was connected to the ac mains when the brew cycle was initiated or prevents the heating element 94 from being energized while the brew cycle is in progress even though the water temperature in the hot water tank 46 may be below the selected temperature. If this happens, the heating element is energized in the manner described above, once brewing cycle has been completed.

Input terminal 2 of the op amp $U3_1$ receives a voltage from the voltage divider constituted by resistors R25 and R28. This voltage is compared by the op amp $U3_1$ to the voltage applied to input terminal 3 from the voltage divider constituted by resistor R26 and temperature sensor on the boiler 78. In normal operation, the voltage at input terminal 3 is greater than at input terminal 2 so that the output of the op amp $U3_1$ is high. The high output of the op amp $U3_1$ reverses diodes D8 and D9 and drives the base of transistor Q6 through resistor R22 turning it on. If the boiler temperature exceeds a predetermined temperature, the voltage at input terminal 3 becomes lower than the voltage at input terminal 2 causing the output of the op amp $U3_1$ to go low.

When the output of the op amp $U3_1$ goes low, the transistor Q6 shuts off. With transistor Q6 off, none of the relay coils can be energized and therefore, the entire coffee making machine 10 shuts down. The low output of the op amp $U3_1$ also pulls pin 3 of the inverter low through diode D9. This resets the brew cycle on the inverter U1 and allows pin 11 of the inverter to go high. Pin 10 of the inverter in turn goes low and this starts the timer U2. The low output of the op amp $U3_1$ causes pin 11 of the timer U2 to go low through diode D8 placing the timer in the 1 second mode described previously. After one second elapses, the timer U2 times out and the service light 36 is illuminated in the manner previously described.

When the output of op amp $U3_4$ goes high, the voltage at the junction between resistors R25 and R28 increases because of the connection through diode D17. This results in the voltage at input terminal 2 of op amp $U3_1$ always being higher than the voltage at pin 3 of the timer U2 which causes the output of the op amp $U3_1$ to remain low preventing the coffee-making machine 10 from operating. When the machine enters this state it can be reset by turning the on/off switch 26 off and then on again.

The voltage on input terminal 5 of op amp $U3_2$ is determined by the voltage divider constituted by resistors R24 and R27 while the voltage on input terminal 6 is determined by the voltage divider constituted by resistor R26 and the temperature sensor on the boiler 78. The voltage at input terminal 5 in normal operation, is always greater than the voltage at input terminal 6. This results in the op amp $U3_2$ supplying a high output which reverses diode D7. If the temperature sensor on the boiler becomes disconnected from contact nodes CN2, the voltage at input terminal 6 will exceed the voltage at input terminal 5 resulting in the output of the op amp $U3_2$ going low. When the output of op amp $U3_2$ goes low, pin 3 of the inverter U1 is held low which causes the output at pins 4 and 5 of the inverter to go high and the output at pin 6 of the inverter to go low. With the output at pin 6 of the inverter low, the base of transistor Q5 is held low through resistor R21 preventing the boiler 78 from operating.

Figure 4:
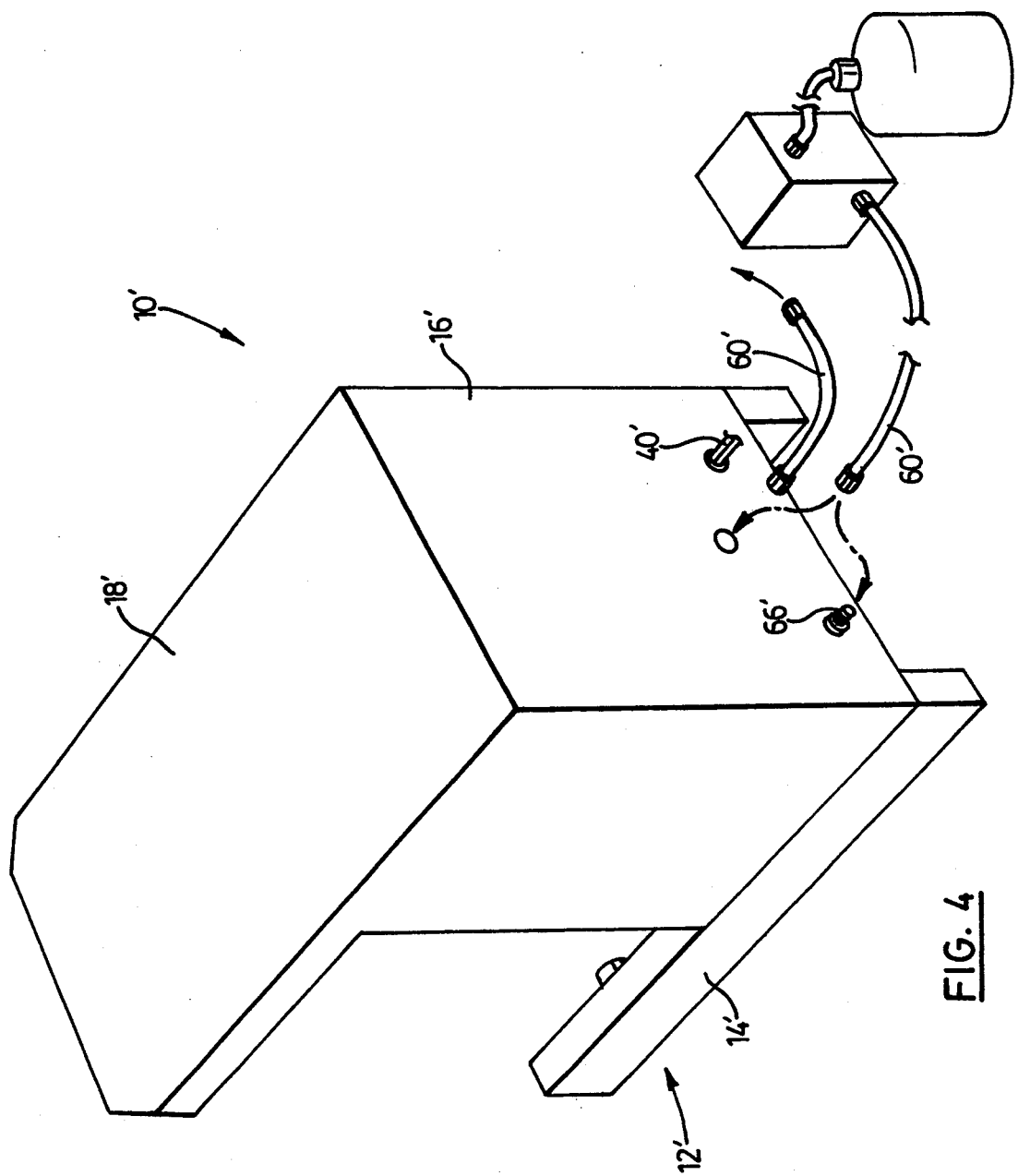
FIG. 4 is a perspective view an alternative embodiment of the coffee-making machine taken from above and from the rear.

FIG. 4 shows an alternative embodiment of the coffee-making machine. In this embodiment, like reference numerals will be used to indicate like components with a "'" added for clarity. The coffee-making machine 10' is very similar to the one described previously but is modified to receive its water supply from an alternative source such as bottled water 200 as opposed to the mains water supply. As can be seen, near the back wall of the column 16' is located a pump 202 having an inlet conduit 204 extending into the bottled water 200. The outlet of the pump 202 can either be connected to the valve 58' or can be connected to the end of the drain tube 64'.

When the outlet of the pump 202 is connected to the valve 58', the pump is also connected to the ac mains through switch SK1. Therefore, the pump 202 is turned on when the valve 58' is opened so that the pump draws water from the bottle and pumps it into the cold water chamber 48. When the water level in the cold water chamber 48 reaches the upper level sensor 70', the valve 58' is closed and the pump 202 is shut off in the manner described previously.

When the pump 202 is connected to the drain tube 64', the valve 58' is isolated from switch SK1 and the pump is connected to the switch SK1 so that when the water level in the cold water chamber 48' falls below the lower level sensor 72', the pump 202 is connected to the ac mains allowing the pump to draw water from the bottle into the cold water tank via the drain outlet 62'.

When the pump 202 is connected to the drain tube 64', the valve can also be connected to the mains water supply so that when the water level in the cold water chamber 48' falls below the lower level sensor 72', the valve 58' can be opened and the pump 202 can be operated. In this instance, the majority of the water entering the cold water tank will be from the pump with the valve 58' being closed and the pump 202 being turned off when the water level in the cold water tank reaches the upper level sensor 70'. In this arrangement, if the bottled water supply runs out, the cold water chamber ? was still be filled by water entering the cold water chamber via the mains water supply preventing the controller 100 from detecting a service condition.

The present invention provides advantages in that the use of the boiler to heat water on an "as needed" basis allows a smaller reservoir to be used. This permits the overall vertical dimension of the coffee-making machine to be reduced allowing it to fit between counters and overhead cupboards. Also, the upper and lower level sensors in conjunction with the controller ensure that the reservoir holds sufficient water to brew a full pot of coffee. If insufficient water is held in the cold water tank, the coffee-making machine will not be permitted to initiate a brew cycle.

The notch in the baffle also allows heated water in the hot water tank to radiate heat into the cold water tank when the coffee-making machine is dormant for extending periods of time. This increases the temperature of the water in the cold water tank and accelerates the brewing process when initiated. Moreover, by dividing the reservoir into separate tanks, less power is used to heat water to be withdrawn from the coffee-making machine via the faucet. In addition, because the heating element is disabled when the brew cycle is initiated power is conserved.

It should be apparent to those of skill in the art that alternative arrangements may be implemented without departing from the scope of the invention as defined by the appended claims.

We claim:

1. A coffee-making machine of the type to receive water from an external source and deliver hot water to ground coffee comprising:

a reservoir to receive and hold water from said external source;

a boiler connected to said reservoir so that fluid flows from said reservoir to said boiler;

a discharge head connected to said boiler so that fluid flows from said boiler to said discharge head;

a controller in communication with said boiler and being responsive to a brew command, wherein said reservoir includes a lower level sensor and an upper level sensor, said upper level sensor for detecting a reservoir full condition, said controller connecting said boiler to a power supply to energize said boiler and heat water received from said reservoir upon receipt of said brew command and when the water in said reservoir is at said full condition as detected by said upper level sensor, said controller disconnecting said boiler from the power supply when a sufficient amount of water has entered said boiler from said reservoir and the water in said reservoir drops below said lower level sensor; and valved inlet means responsive to said controller and acting between said external source and said reservoir, said controller opening said valved inlet means when the water in said reservoir drops below said lower level sensor and closing said valved inlet means when the water level in said reservoir is detected by said upper level sensor.

2. The coffee making machine as defined in claim 1 further comprises timing means, said timing means being initiated when said valved inlet means is opened, said timing means being reset if the water level in said reservoir is detected by said upper level sensor within a preselected time, said timing means providing output to said controller to close said valved inlet means if the water level in said reservoir is not detected by said upper level sensor within said preselected time to indicate a fault condition.

3. The coffee-making machine as defined in claim 1 wherein said discharge head includes an expansion chamber and a spray head to deliver hot water to said ground coffee, said expansion chamber interconnecting said boiler and said spray head.

4. The coffee-making machine as defined in claim 3 further comprising a steam trap including conduit means extending between said expansion chamber and said reservoir.

5. The coffee-making machine as defined in claim 1 wherein said reservoir is divided into a hot water tank and a cold water tank by a baffle, said cold water tank communicating with said valved inlet means and housing said upper and lower level sensors, said hot water tank receiving water from said cold water tank and including a heating element responsive to said controller to heat water therein to a preselected temperature; and faucet means to allow heated water to be withdrawn from said hot water tank.

6. The coffee-making machine as defined in claim 5 wherein said controller disables said heating element when said boiler is initiated.

7. The coffee-making machine as defined in claim 6 further comprising temperature sensing means on said hot water tank, said controller monitoring the temperature sensing means and initiating said heating element when the temperature of water in said hot water tank falls below said preselected temperature.

8. The coffee-making machine as defined in claim 7 further comprising means to detect isolation of said temperature sensing means from said controller, said detection means providing input to said controller to cause said controller to disable said heating element when said temperature sensing means is isolated from said controller.

9. The coffee making machine as defined in claim 5 wherein said baffle has a notch formed therein to permit fluid to flow from said cold water tank to said hot water tank before the water level in said reservoir reaches said upper level sensor and an anti-splash guide adjacent said notch and running along said baffle within said hot water tank.

10. The coffee making machine as defined in claim 5 wherein said discharge head includes an expansion chamber and a spray head to deliver hot water to said ground coffee, said expansion chamber interconnecting said boiler and said spray head, said coffee-making machine further including a steam trap including conduit means extending between said expansion chamber and said cold water tank.

11. The coffee-making machine as defined in claim 1 further comprising temperature sensing means associated with said boiler, said controller monitoring the temperature sensing means and disabling said boiler when the temperature thereof exceeds a preselected temperature.

12. The coffee-making machine as defined in claim 1 further comprising a one way valve acting between said reservoir and said boiler to inhibit back flow from said boiler to said reservoir.

13. A coffee-making machine as defined in claim 1 further including pump means in communication with said reservoir and responsive to said controller, said pump means being initiated to draw water from a contained source when the water level in said reservoir falls below said lower level sensor.

14. A coffee-making machine of the type to receive water from an external source and deliver hot water to ground coffee comprising:
- a reservoir to receive and hold water and being divided into a hot water tank and a cold water tank by a baffle, said cold water tank communicating with valved inlet means connected to said external source;
- heating means associated with said cold water tank to heat water held therein prior to delivery of heated water to said ground coffee;
- a discharge head to deliver heated water to said ground coffee;
- means to deliver heated water to said discharge head; and
- a controller in communication with said heating means and said delivery means, said controller initiating said delivery means to deliver heated water to said discharge head in response to a brew command, wherein said hot water tank receives water from said cold water tank and includes a heating element responsive to said controller to heat water therein to a preselected temperature and faucet means to allow heated water to be withdrawn from said hot water tank.

15. The coffee-making machine as defined in claim 14 wherein said cold water tank includes a lower level sensor and an upper level sensor, said controller initiating said delivery means in response to said brew command only when the water in said cold water tank is detected by said upper level sensor, said controller disabling said delivery means when the water in said cold water tank drops below said lower level sensor.

16. The coffee-making machine as defined in claim 15 further comprising temperature sensing means on said hot water tank, said controller monitoring the temperature sensing means and initiating said heating element when the temperature of water in said hot water tank falls below said preselected temperature.

17. The coffee-making machine as defined in claim 16 further comprising means to detect isolation of said temperature sensing means from said controller, said detection means providing input to said controller to cause said controller to disable said heating element.

18. The coffee-making machine as defined in claim 17 wherein said baffle has a notch formed therein to permit fluid to flow from said cold water tank to said hot water tank before the water level in said reservoir reaches said upper level sensing means and an anti-splash guide adjacent said notch and running along said baffle within said hot water tank.

* * * * *

UNITED STATES PATENT AND TRADEMARK OFFICE
CERTIFICATE OF CORRECTION

PATENT NO. : 5,404,794
DATED : April 11, 1995
INVENTOR(S) : Dahyabhai U. Patel, et al It is certified that error appears in the above-indentified patent and that said Letters Patent is hereby corrected as shown below:

COLUMN 9

Line 12, "is" (2nd occurence) should read--it--

Line 29, "coffee making" should read--coffee-making--

COLUMN 11

Line 64, "clapses," should read--elapses,--

COLUMN 12

Line 68, "? was" should read--48' will--

COLUMN 13

Line 61, "coffee making" should read--coffee-making--

UNITED STATES PATENT AND TRADEMARK OFFICE
CERTIFICATE OF CORRECTION

PATENT NO. : 5,404,794
DATED : April 11, 1995
INVENTOR(S) : Dahyabhai U. Patel, et al It is certified that error appears in the above-indentified patent and that said Letters Patent is hereby corrected as shown below:

<u>COLUMN 14</u>

Line 38, "coffee making" should read--coffee-making--
    Line 45, "coffee making" should read--coffee-making--

Signed and Sealed this

Seventeenth Day of October, 1995

*Attest:*

BRUCE LEHMAN

*Attesting Officer*      *Commissioner of Patents and Trademarks*